(12) United States Patent
Shin et al.

(10) Patent No.: US 9,404,751 B2
(45) Date of Patent: Aug. 2, 2016

(54) APPARATUS AND METHOD FOR PROVIDING 3D MAP SHOWING AREA OF INTEREST IN REAL TIME

(71) Applicant: Samsung Electronics Co. Ltd., Suwon-si, Gyeonggi-gu (KR)

(72) Inventors: Dae-Kyu Shin, Suwon-si (KR); Ik-Hwan Cho, Suwon-si (KR); Sung-Hwan Baek, Suwon-si (KR); Tae-Hwan Son, Suwon-si (KR); Gong-Wook Lee, Suwon-si (KR); Kyu-Sung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 13/909,379

(22) Filed: Jun. 4, 2013

(65) Prior Publication Data

US 2013/0332078 A1    Dec. 12, 2013

Related U.S. Application Data

(60) Provisional application No. 61/656,149, filed on Jun. 6, 2012.

(30) Foreign Application Priority Data

Mar. 15, 2013    (KR) .................. 10-2013-0028205

(51) Int. Cl.

| | |
|---|---|
| *G01C 21/00* | (2006.01) |
| *G06T 17/05* | (2011.01) |
| *G06T 19/20* | (2011.01) |
| *G06F 17/30* | (2006.01) |

(52) U.S. Cl.
CPC ................ *G01C 21/00* (2013.01); *G06F 17/30* (2013.01); *G06T 17/05* (2013.01); *G06T 19/20* (2013.01); *G06T 2219/2012* (2013.01)

(58) Field of Classification Search
CPC ........ G01C 21/00; G06T 17/05; G06T 19/00; G06T 19/20; G06T 2219/2012
USPC ......... 701/532, 446, 533, 447, 448, 450, 451, 701/454, 461; 345/419, 420, 581, 582, 589, 345/619, 624, 629, 630, 660; 382/108, 154, 382/254, 274, 275, 228, 285, 298, 299, 305, 382/307; 715/408–408
See application file for complete search history.

(56) References Cited

U.S. PATENT DOCUMENTS

| 8,339,934 | B2 * | 12/2012 | Heath et al. ................... 370/208 |
| 8,422,825 | B1 * | 4/2013 | Neophytou et al. .......... 382/294 |
| 8,749,580 | B1 * | 6/2014 | Lininger ........................ 345/629 |
| 2009/0141966 | A1 * | 6/2009 | Chen et al. .................... 382/154 |
| 2013/0069944 | A1 * | 3/2013 | Altman et al. ................ 345/420 |

* cited by examiner

*Primary Examiner* — Richard Camby
(74) *Attorney, Agent, or Firm* — Jefferson IP Law, LLP (57) ABSTRACT

An apparatus and a method for providing a three Dimensional (3D) map showing an area of interest in real time are disclosed. The method includes receiving terminal view information of a plurality of terminals, determining an object of interest on a 3D map based on the received terminal view information; and reconfiguring a 3D map including the object of interest. Position information on an area receiving a lot of attention from the public, path information by which the user moves to the area, and a preview image of the area in real time may be provided.

19 Claims, 4 Drawing Sheets

APPARATUS AND METHOD FOR PROVIDING 3D MAP SHOWING AREA OF INTEREST IN REAL TIME

PRIORITY

This application claims the benefit under 35 U.S.C. §119(e) of a U.S. Provisional application filed on Jun. 6, 2012 in United States Patent and Trademark Office and assigned Ser. No. 61/656,149, and under 35 U.S.C. §119(a) of a Korean patent application filed on Mar. 15, 2013 in the Korean Intellectual Property Office and assigned Serial No. 10-2013-0028205, the entire disclosures of which are hereby incorporated by reference.

BACKGROUND OF THE INVENTION

1. Field of the Invention

The present invention relates generally to an apparatus and a method for providing a three Dimensional (3D) map. More particularly, the present invention relates to an apparatus and a method for providing a 3D map showing an area of interest having high public interest in real time.

2. Description of the Related Art

According to the related art, a navigation system is mounted to various mobile entities such as a ship, an aircraft, a vehicle and the like and performs functions associated with informing a driver of a current position of the mobile entity, calculating an optimal path to a desired destination, and guides the driver based on the path. In the navigation system, a navigation terminal typically stores map data and visually guides the optical path to the destination by using the stored map data. For example, the navigation terminal stores information associated with actual streets, buildings, facilities, and the like as numerical map data in a predetermined form, matches position information received from a GPS with the pre-stored map data, and provides guidance of an optimal path to the destination of the mobile entity through a screen.

A navigation system according to the related art simply displays map data including information on streets, buildings, facilities, and the like around the user.

However, according to the related art, when the user desires to receive information on an area having high public interest in a place at which the user is located, the user is required to using a terminal providing the navigational service to search for information on an area currently having high public interest, thereby inconveniencing the user.

Further, according to the related art, even though the user has searched for the information on the area having high public interest, the found information may be not provided in real time.

Therefore, a need exists for an apparatus and a method for providing a three Dimensional (3D) map including information on an area having high public interest to the user in real time.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for providing a three Dimensional (3D) map including information on an area having high public interest to the user in real time.

In accordance with an aspect of the present invention, an apparatus for providing a 3D map showing an area of interest in real time is provided. The apparatus includes a map database which stores a 3D map, a transceiver which receives terminal view information of a plurality of terminal, an interest object determiner which determines an object of interest on the 3D map based on the received terminal view information, and a map reconfiguration unit which reconfigures a 3D map including the object of interest.

In accordance with another aspect of the present invention, a method of providing a 3D map showing an area of interest in real time is provided. The method includes receiving terminal view information of a plurality of terminals, determining an object of interest on a 3D map based on the received terminal view information, and reconfiguring a 3D map including the object of interest.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention display an object of interest which attracts the attention of a plurality of users by using a three-Dimensional (3D) map and detect an area having high public interest in real time to provide various services.

As a non-exhaustive illustration only, a terminal described herein may refer to mobile devices such as a cellular phone, a Personal Digital Assistant (PDA), a digital camera, a portable game console, and an MP3 player, a Portable/Personal Multimedia Player (PMP), a handheld e-book, a portable lap-top PC, a Global Positioning System (GPS) navigation system, and the like capable of wireless communication or network communication consistent with that disclosed herein.

Figure 1:
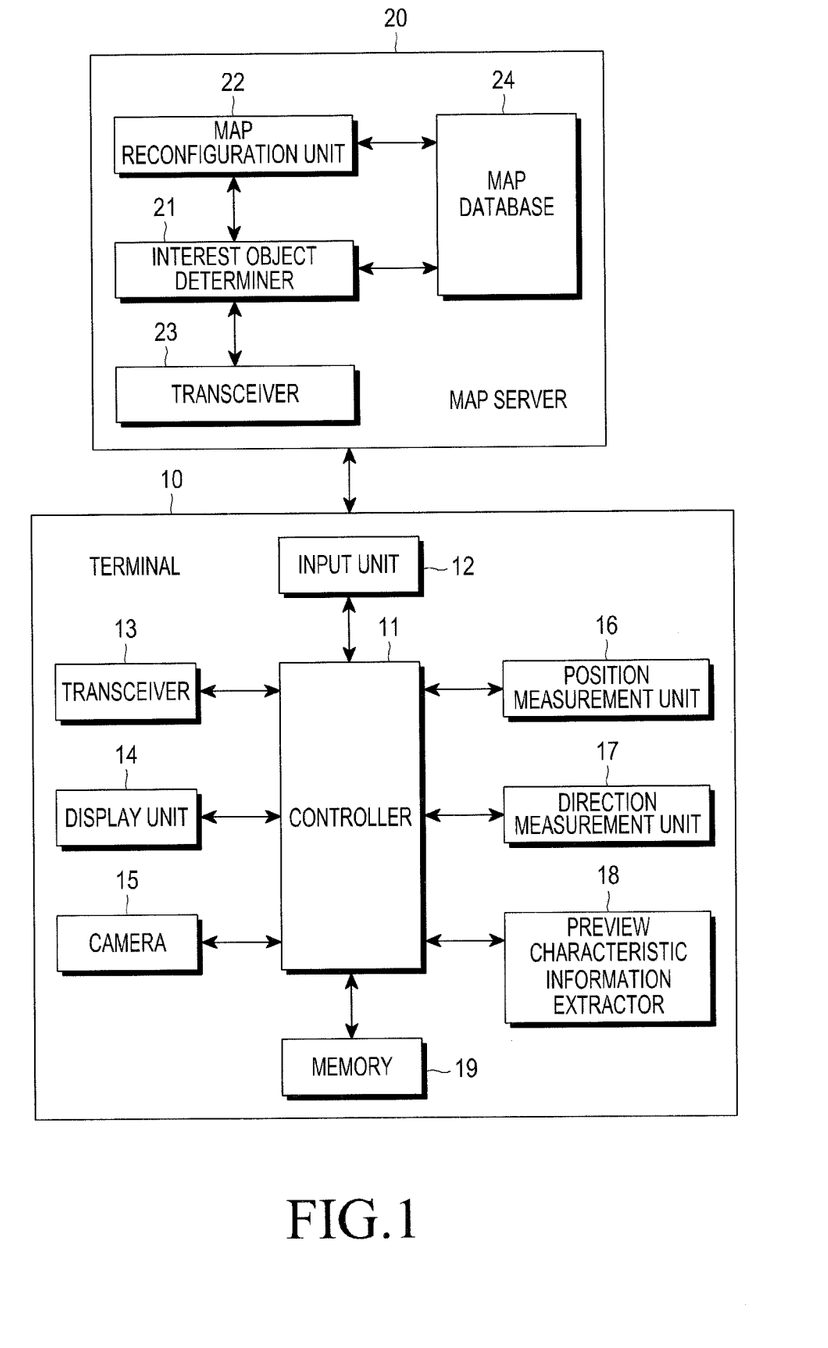
FIG. 1 illustrates a configuration of a three-Dimensional (3D) map system according to an exemplary embodiment of the present invention.

FIG. 1 illustrates a configuration of a 3D map system according to an exemplary embodiment of the present invention.

Referring to FIG. 1, the 3D map system includes a terminal 10 and a map server 20. According to exemplary embodiments of the present invention, an example in which the terminal 10 is located in a place having public interest such as a location of a speech, a performance, or the like is described.

The terminal 10 includes a controller 11, an input unit 12, a transceiver 13, a display unit 14, a camera 15, a position measurement unit 16, a direction measurement unit 17, a preview characteristic information extractor 18, and a memory 19.

The controller 11 includes a Central Processing Unit (CPU), a Read Only Memory (ROM) storing a control program for controlling the terminal 10, and a Random Access Memory (RAM) storing a signal or data input to the terminal 10 or used as a storage area for operations performed in the terminal 10. The CPU may include at least one core (e.g., the CPU may include a single core, a dual core, a triple core, or a quad core), and the CPU, the ROM, and the RAM may be mutually connected through an internal bus.

According to exemplary embodiments of the present invention, the controller 11 controls the position measurement unit 16 (e.g., a GPS unit) to measure position information of the terminal 10 and controls the direction measurement unit 17 (e.g., a direction sensor) to measure direction information such as a direction of a view of a camera included in the terminal 10. Further, the controller 11 controls the preview characteristic information extractor 18 to extract preview characteristic information indicating a feature point of an object included in a preview image output from the camera 15. As an example, a method of extracting the feature point within the image includes a general method of extracting the feature point.

The controller 11 generates terminal view information including position information, view information, and preview characteristic information of the terminal 10 and transmits the generated information to the map server 20 through the transceiver 13. According to exemplary embodiments of the present invention, the controller 11 may further transmit a preview image output from the camera 15 to the map server 20 according to a request of the map server 20.

The input unit 12 may include a key input means including a plurality of keys for a key input, a pointing input means for a pointing input such as a mouse, and a touch input means for a touch input, and transmits a received input signal to the controller 11 through the above listed means. According to exemplary embodiments of the present invention, the input unit 12 may correspond to a touch screen.

The transceiver 13 transmits generated terminal information to the map server 20.

The display unit 14 may be implemented by a Liquid Crystal Display (LCD), and/or the like. The display unit 14 visually provides a menu, input data, function setting information, and other various information to the user. The display unit 14 may be implemented by various devices other than the LCD. The display unit 14 performs a function of outputting a terminal booting screen, a standby screen, a display screen, a call screen, and other application execution screens.

The camera 15 receives an optical signal and outputs image data. The camera 15 generates and outputs a preview image.

The position measurement unit 16 may include a component such as a GPS using an outdoor position measurement method to measure position information of the terminal 10 (e.g., located outdoors). Further, the position measurement unit 16 may also include components such as a plurality of Wi-Fi modules using an indoor position measurement method to measure position information of the terminal 10 (e.g., located indoors).

The direction measurement unit 17 includes a direction sensor to measure direction information of the terminal 10.

The preview characteristic information extractor 18 extracts preview characteristic information indicating a feature point of an object within the preview image output from the camera 15.

The memory 19 stores signals or data input/output in accordance with operations of the input unit 12, the transceiver 13, the display unit 14, the camera 15, the position measurement unit 16, the direction measurement unit 17, and the preview characteristic information extractor 18 under a control of the controller 11. The memory 19 stores control programs and applications for controlling the terminal 10 or the controller 11.

The term "memory" includes the memory 19, the ROM or RAM within the controller 11, and a memory card (e.g., an SD card or a memory stick) mounted to an image reproduction device. The memory 19 may include a non-volatile memory, a volatile memory, a Hard Disk Drive (HDD), a Solid State Drive (SSD), and the like.

According to exemplary embodiments of the present invention, an example in which the terminal 10 operates as a request terminal which makes a request for a 3D map is described.

The request terminal may include the same components as those of the terminal 10 described above.

The controller 11 transmits a request for a 3D map to the map server 20 through the transceiver 13, receives the 3D map requested by the map server 20, and displays the received 3D map through the display unit 14. When the controller 11 displays the 3D map, the controller 11 may emphasize an object of interest set on the 3D map. For example, the controller 11 may emphatically display a color of a building or an object set as the object of interest or display attention degree information in which an amount of attention being given is indicated by a numerical value together. The attention degree information may be expressed in a form of a graph, a bar, or the like.

The input unit 12 may include a key input means including a plurality of keys for a key input, a pointing input means for a pointing input such as a mouse, and a touch input means for a touch input, and transmits a received input signal to the controller 11 through the above listed means. According to exemplary embodiments of the present invention, the input unit 12 may correspond to a touch screen.

The transceiver 13 transmits generated terminal information to the map server 20.

The display unit 14 may be implemented by a Liquid Crystal Display (LCD), and/or the like. The display unit 14 visually provides a menu, input data, function setting information, and other various information to the user. The display unit 14 may be implemented by various devices other than the LCD. The display unit 14 performs a function of outputting a terminal booting screen, a standby screen, a display screen, a call screen, and other application execution screens.

The camera 15 receives an optical signal and outputs image data. The camera 15 generates and outputs a preview image.

The position measurement unit 16 includes a GPS and/or the like. The position measurement unit 16 measures position information of the terminal 10.

The direction measurement unit 17 may also include a direction sensor to measure direction information of the terminal 10.

The preview characteristic information extractor 18 extracts preview characteristic information indicating a feature point of an object within the preview image output from the camera 15.

According to exemplary embodiments of the present invention, the request terminal may not include the position measurement unit 16, the direction measurement unit 17, and the preview characteristic information extractor 18.

The memory 19 stores signals or data input/output in accordance with operations of the input unit 12, the transceiver 13, the display unit 14, the camera 15, the position measurement unit 16, the direction measurement unit 17, and the preview characteristic information extractor 18 under the control of the controller 11. The memory 19 stores control programs and applications for controlling the terminal 10 or the controller 11.

According to exemplary embodiments of the present invention, the map server 20 includes an interest object determiner 21, a map reconfiguration unit 22, a transceiver 23, and a map database 24.

The interest object determiner 21 extracts a corresponding map texture from a 3D map based on terminal view information received from a plurality of terminals and determines an object of interest including the extracted map texture.

Specifically, the interest object determiner 21 compares terminal view information including position information, direction information, and preview characteristic information of each terminal with a map texture on the 3D map to extract a map texture corresponding to the terminal view information of each terminal. Thereafter, the interest object determiner 21 determines whether the object including the extracted map texture satisfies a determination requirement for determining the object as the object of interest. The determination requirement corresponds to determining whether the number of terminals corresponding to the extracted map texture is equal to or larger than a preset threshold. When the number of terminals corresponding to the extracted map texture is equal to or larger than the preset threshold, the interest object determiner 21 determines the object including the extracted map texture as the object of interest.

The map reconfiguration unit 22 reconfigures a requested 3D map such that the object of interest is emphatically displayed on the corresponding 3D map. For example, the map reconfiguration unit 22 may reconfigure the corresponding 3D map such that the object of interest is displayed with a particular color together with an identifier indicating position information of each terminal and an identifier indicating direction information of each terminal on the 3D map. Further, the map reconfiguration unit 22 may reconfigure the requested 3D map such that information on a path from a position of the request terminal to a position of the object of interest is displayed together on the 3D map. In addition, the map reconfiguration unit 22 may reconfigure the 3D map such that the 3D map includes an interface for providing a preview image of each terminal displayed on the 3D map.

According to exemplary embodiments of the present invention, the map reconfiguration unit 22 receives a preview image from each terminal according to a preview image reception request of the request terminal and transmits the received preview image to the request terminal.

The transceiver 23 receives terminal information from a plurality of terminals and transmits a reconfigured 3D map to the request terminal.

The map database 24 stores a 3D map. The 3D map is generated by mapping 3D space information into a two Dimensional (2D) map image or photographing an image by using a 3D camera such as a stereo camera from an aircraft.

The map database 24 stores an actual 3D map including an actual image generated by photographing a city or a street by using a camera. As an example, the actual 3D map refers to a 3D map made using an actual photographed image generated by photographing an actual street by using a vehicle or an aircraft. The actual 3D map acquires 3D coordinates (e.g., x axis, u axis, and z axis coordinates) of objects included in an image generated by photographing a city or a street by using a stereo camera mounted to a vehicle and depth information corresponding to distances between the camera used for the photographing and the objects. Further, the actual 3D map may be implemented by photographing a plurality of 2D images in a wide area by using an aircraft, extracting depth information from an overlapping area between two adjacent 2D images among the photographed images, and performing a 3D modeling through 3D mapping. In addition, each object included in the actual 3D map has a plurality of 3D information and depth information. For example, each of a plurality of pixels expressing each object may have 3D information and depth information. Accordingly, the actual 3D map can distinguish outlines of a building such as a front surface, a rear surface, and a side surface of a particular building as well as a position of the particular building and also distinguish between respective floors of the building. In contrast, because a 2D map according to the related art simply uses GPS information, the 2D map has a difference from the actual 3D map in that the 2D map provides only one position information of a particular building but cannot distinguish a front surface, a rear surface, and a side surface of the particular building or respective floors in detail.

Accordingly, through the 3D map reconfigured as described above, exemplary embodiments of the present invention provide position information on an area which is most attractive to the public, path information through which the user can move to the area, and a preview image of the area in real time.

Figure 2:
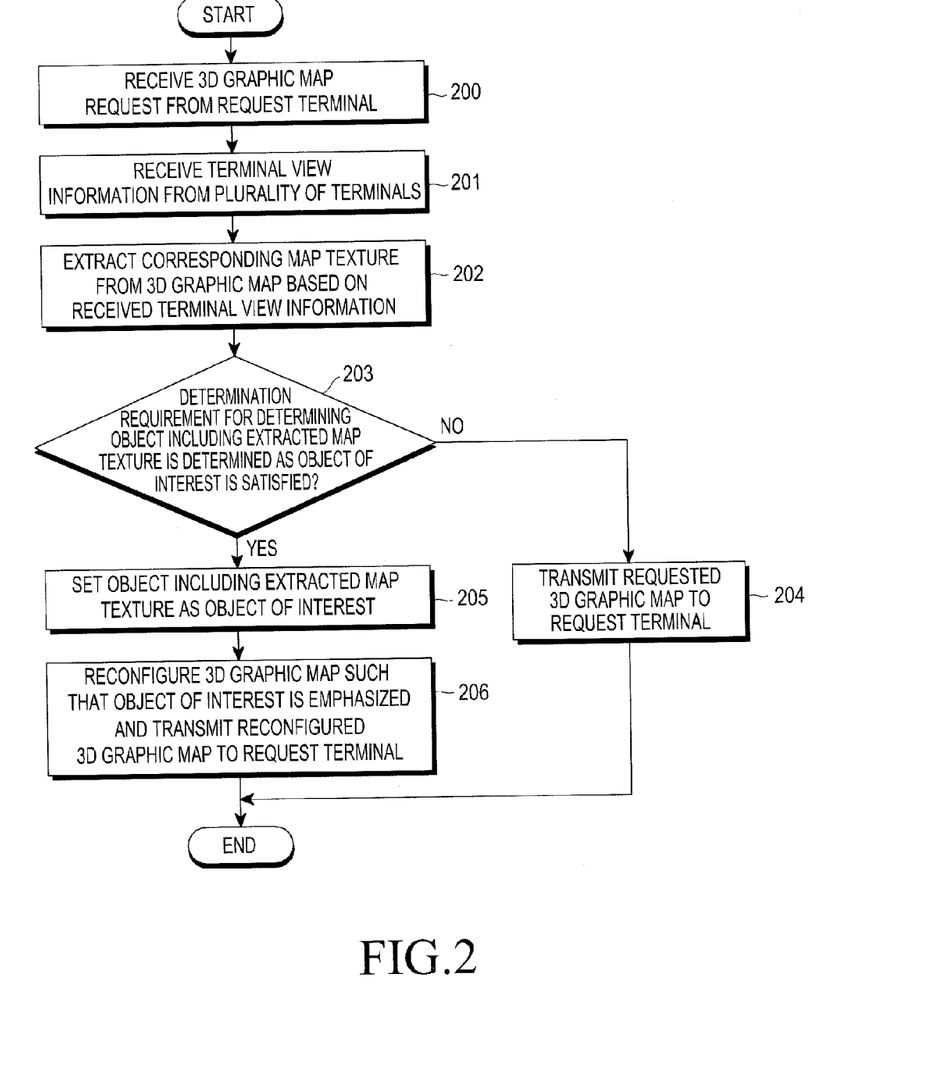
FIG. 2 is a flowchart illustrating a process in which a map server provides a 3D map including objects of interest of a plurality of terminals according to an exemplary embodiment of the present invention.

FIG. 2 is a flowchart illustrating a process in which a map server provides a 3D map including objects of interest of a plurality of terminals according to an exemplary embodiment of the present invention.

Referring to FIG. 2, in step 200, the map server 20 receives a request for the 3D map from the request terminal.

In step 201, the map server 20 receives terminal view information from a plurality of terminals. At this time, the terminal view information includes position information, direction information, and preview characteristic information of each terminal.

In step 202, the map server 20 extracts a corresponding map texture from the 3D map based on the received terminal view information. For example, the map server 20 compares a map texture on the 3D map with position information, direction information, and preview characteristic information of each terminal to extract a map texture corresponding to the terminal view information of each terminal.

In step 203, the map server 20 determines whether an object including the extracted map texture satisfies a determination requirement for determining the object as the object of interest.

When the map server 20 determines that the object satisfies the determination requirement in step 203, the map server 20 proceeds to step 205.

In contrast, when the map server 20 determines that the object does not satisfy the determination requirement in step 203, the map server 20 proceeds to step 204 in which the map server 20 transmits the requested 3D map to the request terminal.

For example, the map server 20 determines whether the number of terminals corresponding to the extracted map texture is equal to or larger than a predetermined threshold. The map server 20 proceeds to step 205 when the number of terminals is equal to or larger than the threshold, and proceeds to step 204 when the number of terminals is smaller than the threshold.

In step 205, the map server 20 sets the object including the extracted map texture as the object of interest. For example, the object of interest may be a building, an object, or the like located around a place at which an event attracting attention of the public such as a speech, a performance, or the like takes place.

In step 206, the map server 20 reconfigures the corresponding 3D map such that the object of interest is emphasized on the requested 3D map and then transmits the reconfigured 3D map to the request terminal.

As described above, exemplary embodiments of the present invention can provide various information on the area receiving a lot of attention from the public to the user through the 3D map.

Figure 3:
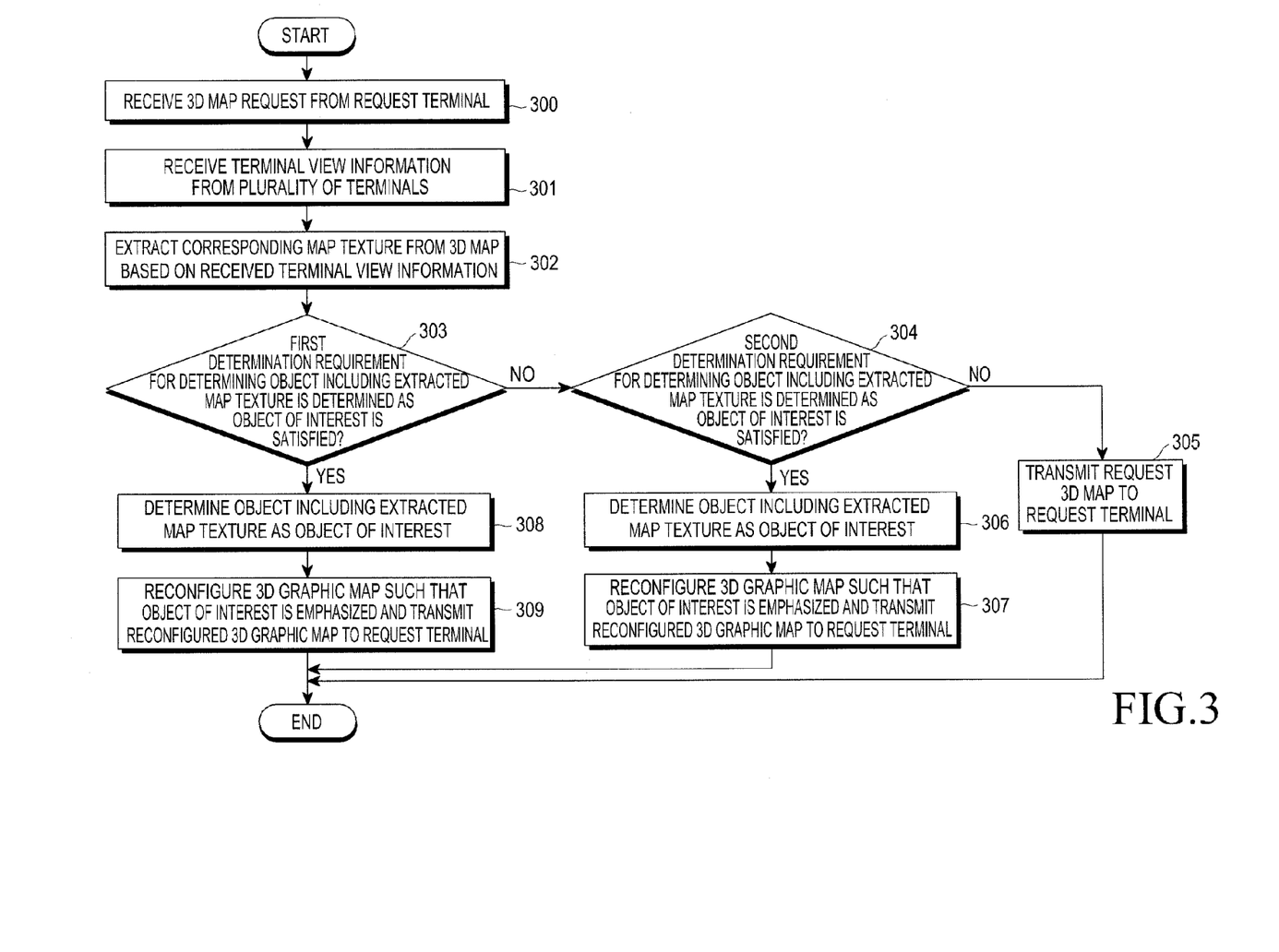
FIG. 3 is a flowchart illustrating a process of determining an object of interest when a number of terminals corresponding to map textures extracted from a map server is smaller than a preset threshold according to an exemplary embodiment of the present invention.

FIG. 3 is a flowchart illustrating a process of determining an object of interest when a number of terminals corresponding to the map texture extracted from the map server is smaller than a preset threshold according to an exemplary embodiment of the present invention.

Referring to FIG. 3, according to an exemplary embodiment of the present invention, an example in which views of terminals of a plurality of users are directed toward a landmark building such as a building which represents a particular area or has a large size will be described. Because the landmark building, due to its size, has a high possibility of appearing in the view of terminals of a plurality of users, the building may not be determined as the object of interest even though the plurality of users takes (e.g., shows) a high interest in it. Accordingly, exemplary embodiments of the present invention further include a process of determining the object of interest when the number of terminals corresponding to the extracted map texture is smaller than the preset threshold.

In step 300, the map server 20 receives a request for the 3D map from the request terminal.

In step 301, the map server 20 receives terminal view information from a plurality of terminals. The terminal view information includes position information, direction information, and preview characteristic information of each terminal.

In step 302, the map server 20 extracts a corresponding map texture from the 3D map based on the received terminal view information.

In step 303, the map server 20 determines whether the object including the extracted map texture satisfies a first determination requirement for determining the object as the object of interest.

When the map server 20 determines that the object satisfies the first determination requirement in step 303, the map server 20 proceeds to step 308.

In contrast, when the map server 20 determines that the object does not satisfy the first determination requirement in step 303, the map server 20 proceeds to step 304.

For example, the map server 20 determines whether the number of terminals corresponding to the extracted map texture is equal to or larger than a preset threshold. The map server 20 proceeds to step 308 when the number of terminals is equal to or larger than the threshold and proceeds to step 304 when the number of terminals is smaller than the threshold.

In step 304, the map server 20 determines whether the object including the extracted map texture satisfies a second determination requirement for determining the object as the object of interest.

When the map server 20 determines that the object satisfies the second determination requirement in step 304, the map server 20 proceeds to step 306.

In contrast, when the map server 20 determines that the object does not satisfy the second determination requirement in step 304, the map server 20 proceeds to step 305.

According to exemplary embodiments of the present invention, the second determination requirement corresponds to determining whether the corresponding map texture on the 3D map matches a map texture of a landmark object such as a building which represents a particular area or has a large size based on terminal view information of the number of terminals smaller than the threshold. The landmark object may be set in advance.

For example, as a result of determining whether the corresponding map texture on the 3D map matches the map texture of the landmark object based on the terminal view information of the number of terminals smaller than the threshold, the map server 20 proceeds to step 306 when the corresponding map texture on the 3D map matches the map texture of the landmark object, and the map server 20 proceeds to step 305 and transmits the requested 3D map to the request terminal when the corresponding map texture on the 3D map does not match the map texture of the landmark object. A method of determining whether the map textures match each other may include various methods such as a general image matching method.

In step 306, the map server 20 determines the landmark object including the extracted map texture as the object of interest. Thereafter, the map server 20 proceeds to step 307.

In step 307, the map server 20 reconfigures the 3D map such that the object of interest is emphatically displayed and transmits the reconfigured 3D map to the request terminal.

In step 308, the map server 20 determines the object including the extracted map texture as the object of interest. Thereafter, the map server 20 proceeds to step 309.

In step 309, the map server 20 reconfigures the 3D map such that the object of interest is emphatically displayed and transmits the reconfigured 3D map to the request terminal.

As described above, through the 3D map, exemplary embodiments of the present invention can provide various information on the area receiving a lot of attention from the public to the user.

Figure 4:
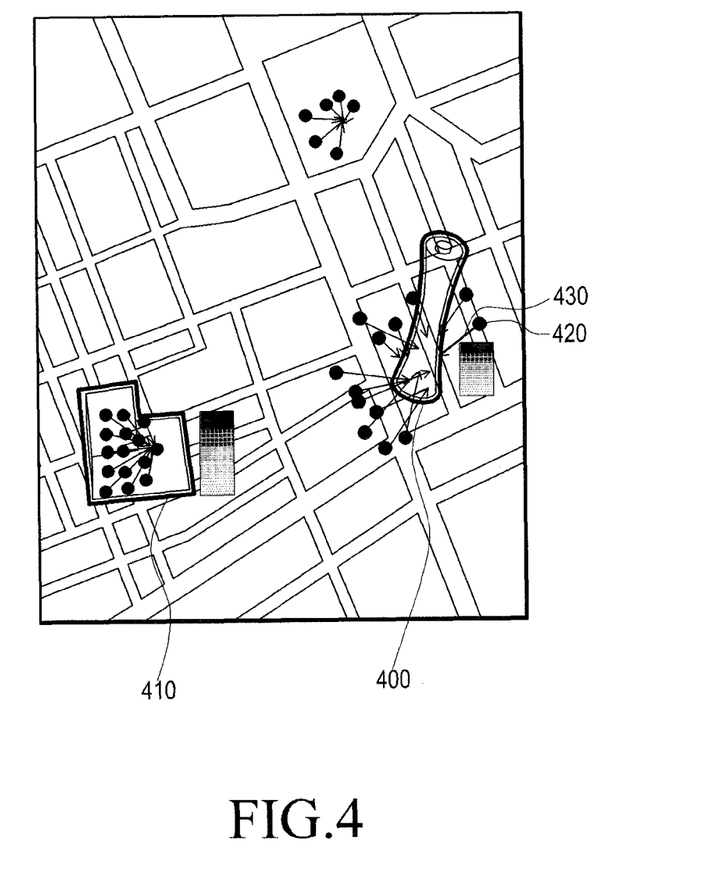
FIG. 4 illustrates an example of a reconfigured 3D map according to an exemplary embodiment of the present invention.

FIG. 4 illustrates an example of the reconfigured 3D map according to an exemplary embodiment of the present invention.

Referring to FIG. 4, as an example, a plurality of users located in a place at which an event receiving a lot of attention from the public takes place, such as a speech, a performance, or the like, transmit position information of the terminal, direction information indicating a direction of a camera mounted to the terminal, and terminal view information including preview characteristic information within a preview image output from the camera to the map server 20 through each terminal.

The map server 20 having received the terminal view information extracts the corresponding map texture from the 3D map based on the terminal view information and sets the object including the extracted map texture as the object of interest. When the place at which the event takes place is a street in front of a particular building, the map server 20 extracts a map texture corresponding to a part of the particular map from the 3D map based on the terminal view information and sets the particular building including the extracted map texture as the object of interest.

When the request for the 3D map is received from the request terminal, the map server 20 reconfigures the 3D map such that the set object of interest is emphatically displayed and transmits the reconfigured 3D map to the request terminal. According to an exemplary embodiment of the present invention, the map server 20 may transmit the requested 3D map together with information on the object of interest to the request terminal. The request terminal having received the 3D map and information may emphatically display the object of interest on the 3D map by using the information on the object of interest.

As described above, FIG. 4 illustrates an example of the 3D map displayed on a screen of the request terminal. When the number of areas receiving a lot of attention from the public is two or more, the map server 20 emphatically displays an edge of the object of interest corresponding to an area receiving the highest attention from the public as illustrated in a reference numeral 400, displays an attention degree indicating a degree of attention of the user in a bar form (or the like), emphatically displays an edge of the object of interest corresponding to another area as illustrated in a reference numeral 410, and displays an attention degree indicating a degree of attention of the user in a bar form (or the like). Further, the map server 20 displays a position of the terminal by using position information of the terminal as illustrated in a reference numeral 420, and displays a direction of a camera of the terminal by using direction information indicating the direction of the camera mounted to the terminal as illustrated in a reference numeral 430.

According to exemplary embodiments of the present invention, although it has been described that the edge of the object of interest is emphatically displayed with a particular color, exemplary embodiments of the present invention can apply any method of emphatically displaying the object of interest.

According to exemplary embodiments of the present invention, the map server 20 may further provide information on a path from the position of the request terminal to a position of the object of interest together with the requested 3D map, so that the user of the request terminal can easily move to the corresponding area.

Meanwhile, when there is an input for selecting one of position information of the terminal displayed on the 3D map received from the map server 20, the request terminal receives a preview image of the selected terminal from the map server 20 according to a selection input and reproduces the received preview image to display the reproduced preview image on the screen. For example, when there is an input for selecting one of position information of the terminal displayed on the 3D map, the request terminal makes a request for a preview image of the selected terminal to the map server 20 and then the map server 20 makes a request for and receives the preview image of the corresponding terminal and transmits the received preview image to the request terminal. The request terminal having received the preview image displays the received preview image on the screen.

Exemplary embodiments of the present invention have advantages of guiding a user to an area receiving a lot of attention from the public in real time and providing various information on an area of interest such as information by which an object receiving a lot of attention from the public within the area can be identified by displaying the area receiving the highest attention from the public on the 3D map.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An apparatus for providing a three Dimensional (3D) map showing an area of interest in real time, the apparatus comprising:
    a map database configured to store a 3D map;
    a transceiver configured to receive terminal view information of a plurality of terminals;
    an interest object determiner configured to:
        determine whether a number of the terminals viewing an object concurrently is more than a preset threshold based on the terminal view information, and determine the object that the terminals are viewing concurrently as an object of interest on the 3D map; and
a map reconfiguration unit configured to reconfigure a 3D map including the object of interest.

2. The apparatus of claim 1, wherein the terminal view information includes at least one of position information indicating positions of the plurality of terminals, direction information indicating directions of the plurality of terminals, and preview characteristic information indicating characteristic information within preview images output from cameras mounted to the plurality of terminals.

3. The apparatus of claim 2, wherein the interest object determiner is further configured to:
compare the terminal view information with a map texture on the 3D map so as to extract a map texture corresponding to the terminal view information of each terminal.

4. The apparatus of claim 1, wherein the interest object determiner is further configured to determine the object including the extracted map texture as the object of interest when the number of terminals more than the preset threshold.

5. The apparatus of claim 1, wherein, when the number of terminals is smaller than the preset threshold, the interest object determiner is further configured to:
determine whether the extracted map texture matches a map texture corresponding to a landmark object, and
determine the landmark object as the object of interest when the extracted map texture matches the map texture corresponding to the landmark object.

6. The apparatus of claim 1, wherein the map reconfiguration unit is further configured to reconfigure the 3D map such that the object of interest is emphatically displayed.

7. The apparatus of claim 6, wherein the map reconfiguration unit is further configured to reconfigure the 3D map such that path information for guiding a path to the object of interest is further displayed.

8. The apparatus of claim 7, wherein the map reconfiguration unit is further configured to reconfigure the 3D map such that the preview images of the object of interest received from the plurality of terminals are provided.

9. A method of providing a three Dimensional (3D) map showing an area of interest in real time, the method comprising:
receiving terminal view information of a plurality of terminals;
determining whether a number of the terminals viewing an object concurrently is more than a preset threshold based on the terminal view information;
determining the object that the terminals are viewing concurrently as an object of interest on a 3D map; and
reconfiguring a 3D map including the object of interest.

10. The method of claim 9, wherein the terminal view information includes at least one of position information indicating positions of the plurality of terminals, direction information indicating directions of the plurality of terminals, and preview characteristic information indicating characteristic information within preview images output from cameras mounted to the plurality of terminals.

11. The method of claim 10, wherein the determining of the object of interest comprises:
comparing the terminal view information with a map texture on the 3D map so as to extract a map texture corresponding to the terminal view information of each terminal.

12. The method of claim 9, wherein the determining of the object of interest further comprises:
determining the object including the extracted map texture as the object of interest when the number of terminals is more than the preset threshold.

13. The method of claim 9, wherein the determining of the object of interest further comprises:
determining whether the extracted map texture matches a map texture corresponding to a landmark object when the number of terminals is smaller than the preset threshold; and
determining the landmark object as the object of interest when the extracted map texture matches the map texture corresponding to the landmark object.

14. The method of claim 9, wherein the reconfiguring of the 3D map comprises:
reconfiguring the 3D map such that the object of interest is emphatically displayed.

15. The method of claim 14, wherein the reconfiguring of the 3D map further comprises:
reconfiguring the 3D map such that path information for guiding a path to the object of interest is further displayed.

16. The method of claim 15, wherein the reconfiguring of the 3D map further comprises:
reconfiguring the 3D map such that the preview images of the object of interest received from the plurality of terminals are provided.

17. The apparatus of claim 1, wherein the map reconfiguration unit generates directions to the object of interest.

18. The method of claim 9, further comprising:
generating directions to the object of interest.

19. A non-transitory computer-readable storage medium storing instructions that when executed cause at least one processor to perform the method of claim 9.

* * * * *